United States Patent
Shin et al.

(10) Patent No.: US 10,791,124 B2
(45) Date of Patent: Sep. 29, 2020

(54) METHOD AND TERMINAL DEVICE FOR ENCRYPTING MESSAGE

(71) Applicant: SAMSUNG ELECTRONICS CO., LTD., Suwon-si (KR)

(72) Inventors: Jun-bum Shin, Suwon-si (KR); Jin-su Kim, Seoul (KR); Kyoung-yong Lee, Seongnam-si (KR); Sung-wook Kim, Seoul (KR); Hye-jin Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 15/810,862

(22) Filed: Nov. 13, 2017

(65) Prior Publication Data

US 2018/0139213 A1    May 17, 2018

(30) Foreign Application Priority Data

Nov. 11, 2016    (KR) .................. 10-2016-0150565

(51) Int. Cl.
*H04L 29/06* (2006.01)
*H04L 9/06* (2006.01)
(Continued)

(52) U.S. Cl.
CPC ............ *H04L 63/123* (2013.01); *H04L 9/065* (2013.01); *H04L 9/0643* (2013.01);
(Continued)

(58) Field of Classification Search
CPC . H04L 63/04; H04L 63/0428; H04L 63/0435; H04L 63/045; H04L 63/0457;
(Continued)

(56) References Cited

U.S. PATENT DOCUMENTS 6,256,733 B1 * 7/2001 Thakkar ............. H04L 9/0822
                                                380/277
6,742,116 B1 * 5/2004 Matsui ............... H04L 9/0894
                                                709/204
(Continued)

FOREIGN PATENT DOCUMENTS

KR    10-2008-0105721 A    12/2008
KR    10-2014-0058196 A     5/2014
(Continued)

OTHER PUBLICATIONS

Ahmet Talha Ozcan et al., "BabelCrypt: The Universal Encryption Layer for Mobile Messaging Applications", Jan. 2015, Financial Cryptography and Data Security, 19th International Conference, FC 2015, (15 Pages Total).

(Continued)

*Primary Examiner* — Eric W Shepperd
(74) *Attorney, Agent, or Firm* — Sughrue Mion, PLLC

(57) ABSTRACT

A method and device for securing data of a message is provided. A method for encrypting a message of a user terminal device includes: receiving a message via a message input window; displaying the received message; encrypting the message by using a key index and an encryption key corresponding to a chatting window for the message based on an instruction for transmitting the message to another chatting party being received; and transmitting the encrypted message to the other chatting party.

17 Claims, 8 Drawing Sheets

(51) Int. Cl.
*H04W 12/04* (2009.01)
*H04L 12/58* (2006.01)
*H04W 12/00* (2009.01)
*H04L 9/08* (2006.01)

(52) U.S. Cl.
CPC ............ *H04L 9/0841* (2013.01); *H04L 51/00* (2013.01); *H04L 63/0428* (2013.01); *H04L 63/061* (2013.01); *H04L 63/0876* (2013.01); *H04W 12/001* (2019.01); *H04W 12/04071* (2019.01); *H04L 51/16* (2013.01)

(58) Field of Classification Search
CPC ......... H04L 51/16; H04L 9/06; H04L 9/0618; H04L 9/065; H04L 9/0841; H04L 9/0861; H04W 12/001
See application file for complete search history.

(56) References Cited

U.S. PATENT DOCUMENTS

| | | | |
|---|---|---|---|
| 8,166,299 | B2 | 4/2012 | Kemshall |
| 9,673,973 | B1* | 6/2017 | Leavy ............... H04W 12/0401 |
| 2002/0099947 | A1 | 7/2002 | Evans |
| 2003/0021416 | A1* | 1/2003 | Brown .................... H04L 63/04 380/277 |
| 2003/0204741 | A1* | 10/2003 | Schoen ............... H04L 63/0281 726/12 |
| 2005/0226420 | A1* | 10/2005 | Makela ................ H04L 9/0838 380/270 |
| 2006/0184535 | A1* | 8/2006 | Kaluskar ................ G06F 16/21 |
| 2007/0050624 | A1* | 3/2007 | Lord .................. H04L 63/0823 713/168 |
| 2008/0256190 | A1* | 10/2008 | Ryan ................... H04L 12/1831 709/206 |
| 2008/0301431 | A1 | 12/2008 | Hea |
| 2010/0205444 | A1 | 8/2010 | Mehta |
| 2010/0257352 | A1* | 10/2010 | Errico ..................... G06F 21/32 713/151 |
| 2010/0332479 | A1* | 12/2010 | Prahlad ................. G06F 16/122 707/741 |
| 2011/0289429 | A1* | 11/2011 | Berry ..................... G06Q 10/10 715/752 |
| 2012/0002810 | A1* | 1/2012 | Imming ................ H04L 9/0656 380/247 |
| 2016/0127126 | A1 | 5/2016 | Sohn et al. |
| 2016/0179938 | A1* | 6/2016 | Ghafourifar ........ G06F 21/6227 707/609 |
| 2018/0019982 | A1* | 1/2018 | Yip ......................... H04L 9/085 |
| 2018/0026789 | A1* | 1/2018 | Qiu ....................... H04L 9/0874 713/168 |

FOREIGN PATENT DOCUMENTS

| | | |
|---|---|---|
| KR | 10-1596479 B1 | 3/2016 |
| KR | 10-2016-0050766 A | 5/2016 |

OTHER PUBLICATIONS

Billy Lau et al., "Mimesis Aegis: A Mimicry Privacy Shield a System's Approach to Data Privacy on Public Cloud", USENIX the Advanced Computing Systems Association, 23rd USENIX Security Symposium, Proceedings of the 23rd USENIX Security Symposium, Aug. 20-22, 2014, San Diego, CA, (pp. 33-48, 17 Pages Total).

* cited by examiner

METHOD AND TERMINAL DEVICE FOR ENCRYPTING MESSAGE

CROSS-REFERENCE TO RELATED APPLICATION

This application claims priority from Korean Patent Application No. 10-2016-0150565, filed on Nov. 11, 2016 in the Korean Intellectual Property Office, the disclosure of which is incorporated herein by reference in its entirety.

BACKGROUND

Field

Methods and Apparatuses consistent with one or more exemplary embodiments relate to a method and device for securing data of a message, and more particularly, to methods for encrypting and decrypting a message on a user terminal itself independently of an application.

Description of the Related Art

As portable terminal devices such as smartphones, tablet PCs, and the like are becoming widespread, users of the portable terminal devices may increasingly use various applications. In particular, users may chat with a third party through various chatting applications instead of using text messages such as existing Short Message Service (SMS)/Multimedia Messaging Service (MMS).

However, chatting through such chatting applications is vulnerable in terms of security.

Therefore, companies running chatting applications are making efforts to maintain security through message encryption. However, users select a chatting application based on ease of use, design, awareness, and the like while understanding that security is an important consideration.

Further, the security of the chatting applications is managed by a private company or a business operator that runs the corresponding application. Therefore, there is a possibility that the corresponding private company or the business operator may abuse the security of the application. In a case in which the security of the application is hacked, it is very likely that important information such as personal information will be leaked or exposed.

Therefore, regardless of the type of chatting application, it is important to develop a technology that allows the user to use the chatting application with peace of mind. As a result, there is a need for a technology capable of performing an encryption independently of the chatting applications.

Various technologies to solve the above-mentioned problems have been proposed in a related art. One technology for encrypting a message is to provide an application programming interface (API) at a platform stage. Here, a platform may be a software platform such as ANDROID and TIZEN.

However, the method of providing the API at the platform stage has disadvantages in that encryption may not be performed when the corresponding API is not used and encryption may not be performed independently of the application.

Meanwhile, in order to perform the encryption in the chatting application, a chatting party must be determined. A related art technology finds the chatting party by performing an optical character recognition (OCR) reading after screen capturing a chatting window of the chatting application.

However, the method for performing the OCR reading has problems in that it does not suggest a solution when the chatting party is a person with the same name, it has a possibility that an error will occur during the OCR reading, and the chatting party is not recognized in the case of a group chatting.

SUMMARY

One or more exemplary embodiments may overcome the above disadvantages and other disadvantages not described above. Also, an exemplary embodiment is not required to overcome the disadvantages described above, and an exemplary embodiment may not overcome any of the problems described above.

Aspects of one or more exemplary embodiments provide a method and device for accurately encrypting a chatting message independently of a server without a separate operation of a user even in a case in which a chatting application is changed.

Aspects of one or more exemplary embodiments also provide a control method and device for encrypting a message independently of a chatting application regardless of the type of chatting application.

According to an aspect of an exemplary embodiment, there is provided a method for encrypting a message of a user terminal device, the method including: receiving a first message via a displayed message input window; displaying the received first message; encrypting the first message using a key index and an encryption key corresponding to a chatting window for the first message based on an instruction for transmitting the first message to another chatting party being received; and transmitting the encrypted first message to the other chatting party.

The method may further include: receiving a second message encrypted using the key index and the encryption key from the other chatting party; decrypting the encrypted second message by using the key index and the encryption key based on the encrypted second message being received from the other chatting party; and displaying the decrypted second message.

The method may further include determining whether a chatting history for the chatting window exists, wherein the encrypting the first message may include encrypting the first message by adding the key index and the encryption key previously determined for the chatting window to the first message, based on determining that the chatting history exists.

The encrypting the first message may further include encrypting the first message by generating the key index and the encryption key corresponding to the chatting window and adding the generated key index and the generated encryption key to the first message, based on determining that the chatting history does not exist.

The encrypting the first message may further include exchanging a session key between at least two terminal devices and generating the key index corresponding to the session key based on determining that the chatting history does not exist.

The session key may be generated by a Diffie-Hellman key agreement protocol.

The encrypted first message may be a stream cipher.

According to an aspect of another exemplary embodiment, there is provided a user terminal device encrypting and decrypting a message, the user terminal device including: an input configured to receive an input of a first message; a communicator configured to perform communication with an external terminal; a display configured to display the input first message; and a processor configured to encrypt the first message using a key index and an encryption key corresponding to a chatting window fir the first message based on an instruction for transmitting the first message to another chatting party being received, and to control the communicator to transmit the encrypted first message to the other chatting party.

The communicator may be configured to receive an encrypted second message from the other chatting party and to provide the encrypted second message to the processor, and the processor may be configured to decrypt the encrypted second message by using the key index and the encryption key based on the encrypted second message being received from the communicator.

The processor may be configured to determine whether a chatting history for the chatting window exists, and to encrypt the first message by adding the key index and the encryption key previously determined for the chatting window to the first message based on determining that the chatting history exists.

The processor may be configured to encrypt the first message by generating the key index and the encryption key corresponding to the chatting window and adding the generated key index and the generated encryption key to the first message, based on determining that the chatting history does not exist.

The processor may be configured to exchange a session key between at least two terminal devices and to generate the key index corresponding to the session key, based on determining that the chatting history does not exist.

The session key may be generated by a Diffie-Hellman key agreement protocol.

The encrypted first message may be a stream cipher.

According to an aspect of another exemplary embodiment, there is provided a non-transitory computer readable recording medium including a program executing a method for encrypting and decrypting a message of a user terminal device, wherein the method includes: receiving a first message via a displayed message input window; displaying the received first message; encrypting the first message using a key index and an encryption key corresponding to a chatting window for the first message based on an instruction for transmitting the first message to another chatting party being received; and transmitting the encrypted first message to the other chatting party.

As described above, according to aspects of one or more exemplary embodiments, when a transmission terminal device and a reception terminal device perform chatting through a chatting application, a chatting message may be encrypted and decrypted independently of a server without a separate operation of a user even in the case in which the chatting application is changed.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF EXEMPLARY EMBODIMENTS

Figure 1:
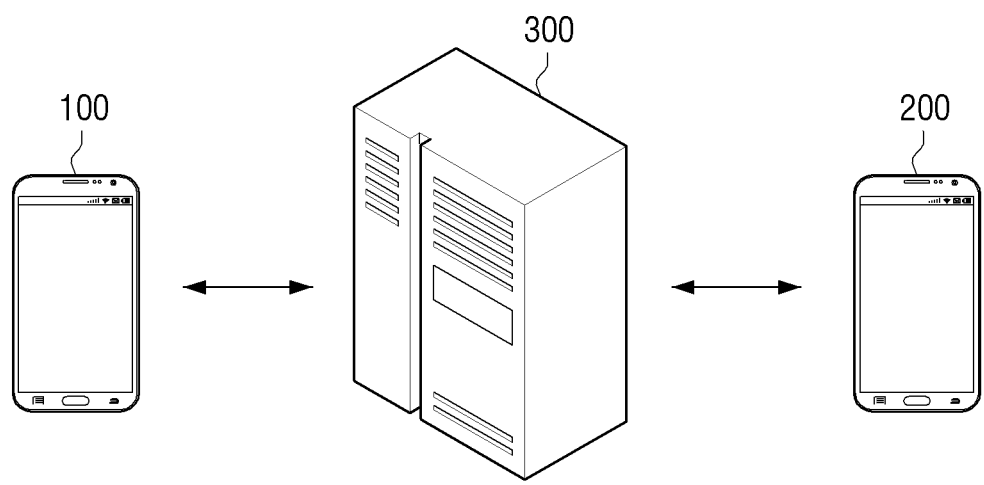
FIG. 1 is a system diagram illustrating a transmission and reception system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. In the drawings, parts irrelevant or insignificant to the description of exemplary embodiments are not illustrated and like reference numerals denote like elements.

Although the terms used in the following description are selected, as much as possible, from general terms that are widely used at present while taking into consideration the functions obtained in accordance with exemplary embodiments, these terms may be replaced with other terms based on intentions of those skilled in the art, customs, emergence of new technologies, or the like. Accordingly, it should be noted that the terms used herein should be construed based on practical meanings thereof and the whole content of this specification, rather than being simply construed based on names of the terms.

Exemplary embodiments may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, combinations between disclosed exemplary embodiments, and substitutions without departing from the scope and spirit of the present disclosure. In describing exemplary embodiments, when it is determined that a specific description of known technologies would obscure the gist of the present disclosure, a detailed description thereof will be omitted.

Terms such as first, second, etc., can be used to describe various components, but the components should not be limited to the terms. The terms are only used to distinguish one component from the others.

As used herein, the singular forms are intended to include plural forms as well, unless the context clearly indicates otherwise. In the present application, the terms "include" or "consist of" intend to designate the presence of features, numbers, steps, operations, components, elements, or a combination thereof that are written in the specification, but do not exclude the presence or possibility of addition of one or more other features, numbers, steps, operations, components, elements, or a combination thereof.

In an exemplary embodiment, a "module" or a "unit" performs at least one function or operation, and may be implemented in hardware, software, or a combination of hardware and software. In addition, a plurality of "modules" or a plurality of "units" may be integrated into at least one module and may be implemented in at least one processor, except for a "module" or a "unit" that must be implemented in specific hardware.

In an exemplary embodiment, a case in which any one part is "connected" with another part includes a case in which the parts are "directly connected" with each other and a case in which the parts are "electrically connected" or "indirectly connected" with each other with other elements interposed therebetween. In addition, a case in which any one part is "connected" with another part includes a physical connection as well as a wireless connection. In addition, unless explicitly described to the contrary, "comprising" any components will be understood to imply the inclusion of other elements rather than the exclusion of any other elements.

The terminology used herein is for the purpose of describing particular exemplary embodiments and is not intended to limit the exemplary embodiments. It is understood that expressions such as "at least one of," when preceding a list of elements, modify the entire list of elements and do not modify the individual elements of the list. Additionally, as used herein, the singular forms "a," "an," and "the" are intended to include the plural forms as well, unless the context clearly indicates otherwise.

FIG. 1 is a system diagram illustrating a transmission and reception system according to an exemplary embodiment.

A transmission and reception system according to an exemplary embodiment may include a transmission terminal device 100, a reception terminal device 200, and an external server 300.

The transmission terminal device 100 and the reception terminal device 200 each transmit and receive a message through a chatting application. However, the transmission terminal device 100 may also receive a message and the reception terminal device 200 may also transmit a message. An operation of the terminal devices will be described in detail with reference to FIG. 2.

The external server 300 serves to transport the messages transmitted from the respective terminal devices 100 and 200. Further, the external server 300 may exchange a session key used when the transmission terminal device 100 and the reception terminal device 200 transmit and receive a message.

A session refers to a period from when a chatting participant establishes a channel for chatting to transmit and receive information to when the chatting participant terminates the channel in which the information is transmitted and received. The session key may be used in only one established session and is removed from the external server 300 when the session is terminated. The other chatting party may encrypt and decrypt a message through the session key. Here, the session key may not be able to derive an encryption key of the participant of the chatting and may not be able to be derived from a previous session key.

Meanwhile, a protocol for establishing the session key may be referred to as a session key establishment protocol, which is classified into a key agreement protocol and a key transport protocol. The key agreement protocol is a scheme in which two chatting participants generate and exchange the respective secrete values to generate a share key. The key transport protocol is a scheme in which one participant of the chatting participants arbitrarily generates the share key to transport it to another participant.

An exemplary embodiment uses a scheme of exchanging the session key through the key agreement protocol, but the session key may also be exchanged by using the key transport protocol in another exemplary embodiment.

In a case in which the exchange of the session key is completed, the transmission terminal device 100 and the reception terminal device 200 may generate a key index and an encryption key by using the session key, and may store the generated key index and encryption key. Here, the key index may be used to determine the other party of chatting and the encryption key may be used to encrypt or decrypt messages.

Specifically, the key index is a value for finding, obtaining, or determining the encryption key. The key index may also be published to other users, other than chatting participants. However, the other users may not be able to determine the encryption key from the key index. Further, a chatting participant may be able to uniquely determine a value of the encryption key using the key index.

Meanwhile, as described above, the session key is deleted when the session between the transmission terminal device 100 and the reception terminal device 200 is terminated. However, the key index is not deleted even in the case in which the session between the transmission terminal device 100 and the reception terminal device 200 is terminated. That is, the key index is a value stored inside the transmission terminal device 100 and the reception terminal device 200. Therefore, in a case in which the transmission terminal device 100 and the reception terminal device 200 additionally transmit and receive the message after the termination of the session, the key index and the encryption key that are previously stored may be used.

After the key index and the encryption key are generated and stored, the user may input the message into a text input window 420 of the chatting application. Here, the input message may be encrypted by the key index and the encryption key and may be transmitted to the reception terminal device 200 through the external server 300.

Further, the transmission terminal device 100 and the reception terminal device 200 may decrypt the encrypted message before displaying the message. That is, the transmission terminal device 100 and the reception terminal device 200 may encrypt and decrypt the message independently of the external server 300.

Figure 2:
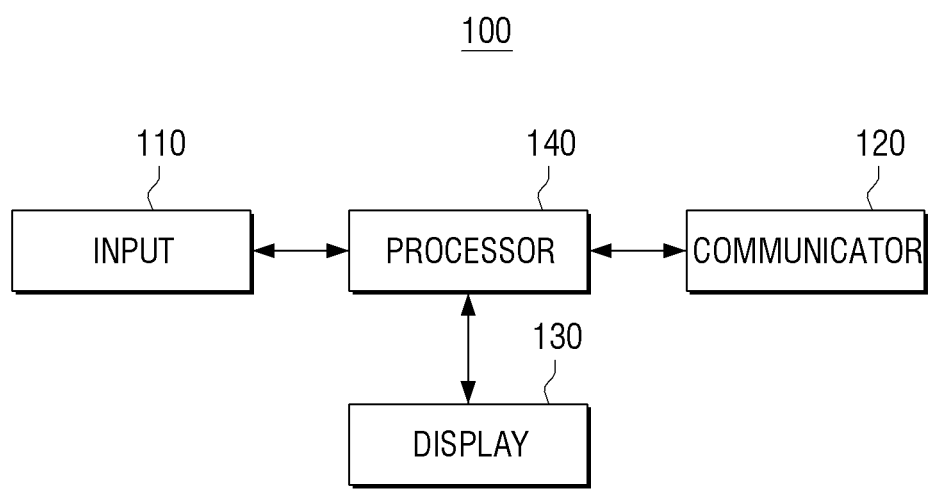
FIG. 2 is a block diagram illustrating a configuration of a terminal device according to an exemplary embodiment.

FIG. 2 is a block diagram illustrating a configuration of a terminal device according to an exemplary embodiment.

The terminal device 100 of FIG. 2 may include an input 110, a communicator 120, a display 130, and a processor 140. However, other components may also be added or included.

The terminal device 100 according to an exemplary embodiment may be a smartphone. However, the terminal device 100 is not limited thereto, but may also be any other terminal device capable of transmitting the message through the chatting application. For example, the terminal device 100 according to an exemplary embodiment may be a tablet personal computer (PC), a mobile phone, a desktop PC, a laptop PC, a netbook computer, a workstation, a personal digital assistant (PDA), and a portable multimedia player (PMP) other than the smartphone, etc.

Meanwhile, the terminal device 100 may include either of the transmission terminal device 100 and the reception terminal device 200. However, the present description will be with reference to the transmission terminal device 100 for convenience, except for in certain particular cases.

The input 110 receives an input of a user. The input 110 according to an exemplary embodiment may include a touch input. However, the input 110 is not limited to such a component, but may include various forms such as a keyboard, a microphone, and the like. In the present specification, the input 110 is described as being limited to the touch input, but is not limited thereto in one or more other exemplary embodiments.

The message input by the input 110 may be a text message. However, the message input by the input 110 is not limited to the text message, but may also include various forms such as photograph files, voice files, video files, and the like in one or more other exemplary embodiments.

The communicator 120 transmits the message encrypted by the processor 140 to the external server 300. The encrypted message is transmitted to the reception terminal device 200 through the external server 300. Meanwhile, although an exemplary embodiment described above describes the case in which the transmission terminal device 100 and the reception terminal device 200 transmit and receive the message through the external server 300, this case is merely one illustrative example and the message may be directly transmitted and received without using the transmission terminal device 100 and the reception terminal device 200. Further, the communicator 120 may transmit the session key for encrypting and decrypting the message during the session period to the reception terminal device 200.

Figure 4:
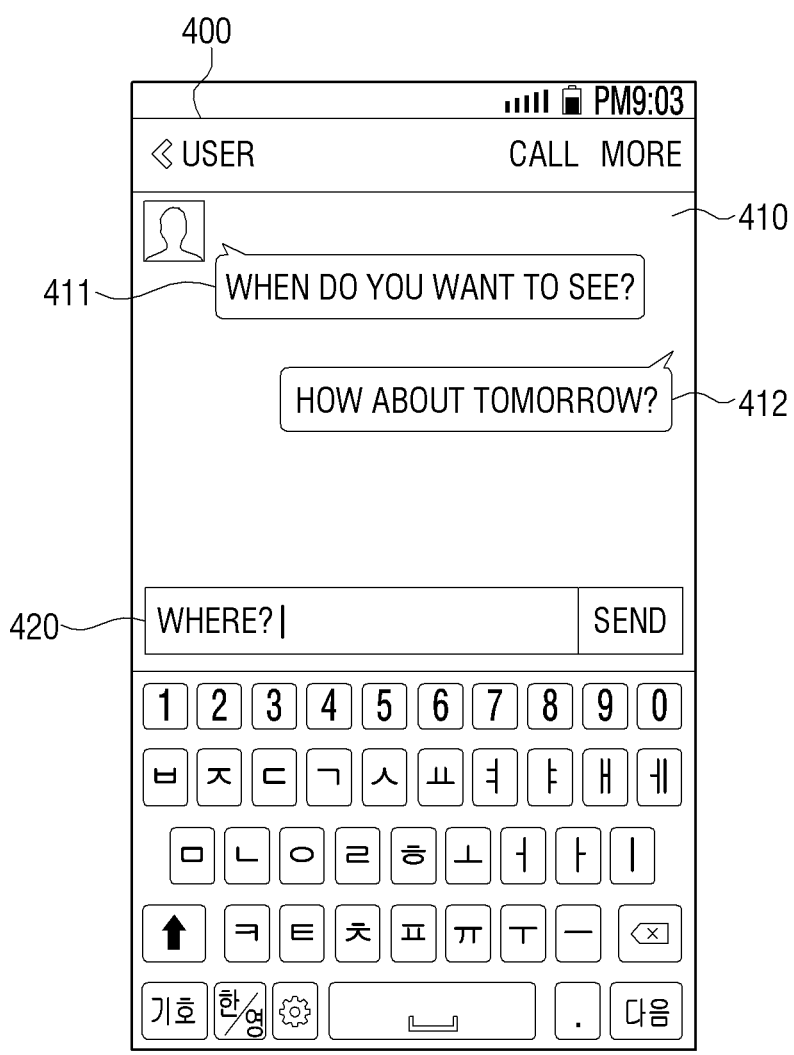
FIG. 4 is an illustrative diagram illustrating an execution screen of a chatting application according to an exemplary embodiment.

The display 130 may output image data. In particular, the display 130 may display an execution screen of the chatting application. As illustrated in FIG. 4, the execution screen 400 of the chatting application may include a chatting window 410 displaying the message and a message input window 420 through which the user inputs a variety of information (e.g., photographs, videos, and the like).

In particular, the display 130 displays the message received from the reception terminal device 200 on the execution screen 400 of the chatting application. Specifically, when an encrypted message of the other chatting party is transmitted to the processor 140 through the communicator 120, the processor 140 may control the display 130 to decrypt the encrypted message and to display the decrypted message.

The processor 140 controls an overall operation of the transmission terminal device 100. In particular, when a user instruction for transmitting the message input to the message input window 420 through the input 110 to the other party of chatting is input, the processor 140 may encrypt the message using the key index and the encryption key corresponding to the chatting window 410 of the message, and may control the communicator 120 to transmit the encrypted message to the reception terminal device 200.

Here, the processor 140 may control the communicator 120 to receive the encrypted message from the reception terminal device 200. In addition, the processor 140 may decrypt the encrypted message by using the key index and the encryption key.

In particular, the processor 140 may determine whether a chatting history of the chatting window exists. In a case in which the chatting history exists, the processor 140 may add the key index and the encryption key pre-existing in the chatting window to the message to encrypt it.

In a case in which the chatting history does not exist, the processor 140 may generate the key index and the encryption key corresponding to the chatting window and may encrypt the message by using the generated key index and encryption key.

The processor 140 may exchange the session key with the reception terminal device to generate the key index and the encryption key. Here, the session key may be generated by a Diffie-Hellman key agreement protocol.

The processor 140 may be implemented in various schemes. For example, the processor 140 may be implemented in at least one of an application specific integrated circuit (ASIC), an embedded processor, a microprocessor, a hardware control logic, a hardware finite state machine (FSM), and a digital signal processor (DSP).

Figure 3:
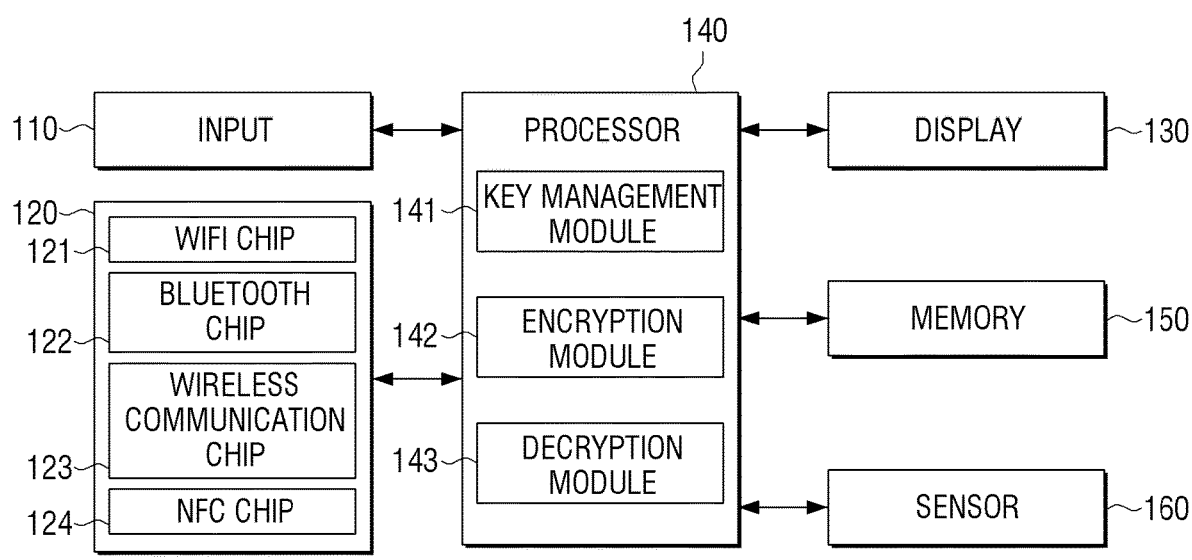
FIG. 3 is a block diagram illustrating a detailed configuration of a terminal device according to an exemplary embodiment.

FIG. 3 is a block diagram illustrating a detailed configuration of a terminal device according to an exemplary embodiment.

Referring to FIG. 3, the transmission terminal device 100 may further include a memory 150 and a sensor 160 other than the input 110, the communicator 120, the display 130, and the processor 140. However, the transmission terminal device 100 is not limited to the above-mentioned configuration, but may be added with additional functions and additional components for executing a function thereof in one or more other exemplary embodiments.

The communicator 120 may include at least one of a Wi-Fi chip 121, a Bluetooth chip 122, a wireless communication chip 123, and a near field communications (NFC) chip 124. In particular, each of the Wi-Fi chip 121 and the Bluetooth chip 122 may perform communication in a Wi-Fi scheme and a Bluetooth scheme, respectively. In a case in which the Wi-Fi chip 121 or the Bluetooth chip 122 is used, the communicator 120 may first transmit and receive a variety of access information such as a service set identifier (SSID), a session key, and the like, connect communication using the variety of information, and then transmit and receive a variety of information. The wireless communication chip 123 may be a chip that performs communication according to various communication standards such as IEEE, ZigBee, 3rd generation (3G), 3rd generation partnership project (3GPP), Long Term Evolution (LTE), and the like. The NFC chip 124 may be a chip that is operated in an NFC scheme that uses a frequency band of 13.56 MHz among various RF-ID frequency bands such as 135 kHz, 13.56 MHz, 433 MHz, 860 to 960 MHz, 2.45 GHz, and the like.

The processor 140 may include a key management module 141, an encryption module 142, and a decryption module 143.

The key management module 141 may manage the session key, the key index, and the encryption key for performing the encryption and the decryption. Specifically, in a case in which the chatting history with the other party of chatting exists, the key management module 141 may receive the key index and the encryption key that are previously stored from the memory 150 and transmit the key index and the encryption key to the encryption module 142 and the decryption module 143. On other hand, in a case in which the chatting history does not exist, the key management module 141 may newly generate a key index and an encryption key and transmit the generated key index and encryption key to the encryption module 142, the decryption module 143, and the memory 150.

As described above, the key management module 141 may generate the session key by using the Diffie-Hellman key agreement protocol.

The Diffie-Hellman key agreement protocol is one of representative methods for exchanging the session key. Specifically, the Diffie-Hellman key agreement protocol is an encryption algorithm using a discrete logarithm difficulty.

Specifically, when it is assumed that the encryption key of the transmission terminal device 100 is Xa and the encryption key of the reception terminal device 200 is Xb, the transmission terminal device 100 and the reception terminal device 200 may obtain a public key Ya of the transmission terminal device 100 and a public key Yb of the reception terminal device 200 by using Mathematical Expression 1:

$$Ya = g\hat{\,}Xa \bmod P$$

$$Yb = g\hat{\,}Xb \bmod P \qquad \text{[Mathematical Expression 1]}$$

Here, g and P, which are Diffie-Hellman parameters, correspond to arbitrary values agreed between the transmission terminal device 100 and the reception terminal device 200.

The transmission terminal device 100 and the reception terminal device 200 may exchange the respective public keys Ya and Yb and then share the session key through Mathematical Expression 2:

$$SK = Yb\hat{\,}Xa \bmod P = (g\hat{\,}Xb)\hat{\,}Xa \bmod P = g\hat{\,}(XaXb) \bmod P$$

$$SK = Ya\hat{\,}Xb \bmod P = (g\hat{\,}Xa)\hat{\,}Xb \bmod P = g\hat{\,}(XaXb) \bmod P \qquad \text{[Mathematical Expression 2]}$$

That is, the transmission terminal device 100 generates the same session key as the session key of the reception terminal device 200 by using a private key Xa of the transmission terminal device 100 and the share key Yb transmitted by the reception terminal device 200, and the reception terminal device 200 generates the same session key as the session key of the transmission terminal device 100 by using a private key Xb of the reception terminal device 200 and the share key Ya transmitted by the transmission terminal device 100.

In this case, the private keys Xa and Xb of the transmission terminal device 100 and the reception terminal device 200 are to be secured, although the Diffie-Hellman parameters g and P may be exposed to a third party.

Further, the key management module 141 may generate the key index by using a cryptographic hash function. The hash function refers to a function that maps data of an arbitrary length to fixed data.

The cryptographic hash function is a kind of hash function and refers to a function having a property in which it is difficult to find a relationship with an original input value from a hash value. The cryptographic hash function may have preimage resistance, second preimage resistance, and collision resistance.

The preimage resistance refers to a property that for a given hash value, it is difficult to find an input value generating the hash value. The second preimage resistance refers to a property that for the input value, it is difficult to change an input while not changing the hash value of the input. The collision resistance refers to a property that it is computationally difficult to find two input values generating the same hash value. Meanwhile, the cryptographic hash function includes MD5 and SHA series hash functions, but is not limited thereto.

For example, the key index may be determined by an output value of an arbitrary hash function. In this case, the input value of the hash function that determines the key index may be an arbitrary value capable of finding a value of the encryption key.

According to an exemplary embodiment, the value of the encryption key may be the input value of the hash function. According to another exemplary embodiment, the time at which the key sharing ends may be the input value of the hash function. However, one or more other exemplary embodiments are not limited thereto, and the key index may be obtained from any related art technology which may be easily deduced by those skilled in the art.

The encryption module 142 may receive the session key, the key index, and the encryption key from the key management module 141 to encrypt the message.

Specifically, the encryption module 142 may encrypt the message through a stream cipher scheme. The stream cipher encrypts the message in units of bits, bytes, or words. In general, the stream cipher may be generated by combining the message and a key stream by an exclusive-or (XOR) operation in units of bits. For the stream cipher, algorithms such as a stream running mode of a block cipher, RC4, Chacha, and the like may be used.

However, this is merely an example, and it is understood that one or more other exemplary embodiments are not limited thereto. Therefore, the message encryption is not limited to the stream cipher method, and a block cipher method using algorithms such as DES, AES, Blowfish, RC5, and the like may also be used.

The decryption module 143 decrypts the encrypted message received from the transmission terminal device 100 or the reception terminal device 200, so as to correspond to the encryption module 142. The decryption module 143 may receive the session key, the key index, and the encryption key from the memory 150 for decryption.

The memory 150 may store the session key, the key index, and the encryption key generated by the processor 140. The memory 150 may receive and store the session key, the key index, and the encryption key from the processor 140. Further, when the processor 140 requests, the memory 150 may transmit session key, the key index, and the encryption key to the processor 140. Further, the memory 150 may store an encryption algorithm program used in the encryption module 142.

The sensor 160 may be implemented by various sensing sensors for sensing a user input. For example, the sensor 160 may include a touch sensor. The touch sensor may be coupled to the display 130 to implement a touch screen. However, this is merely an example, and it is understood that one or more other exemplary embodiments are not limited thereto.

FIG. 4 is an illustrative diagram illustrating an execution screen of a chatting application according to an exemplary embodiment.

The execution screen 400 may include the chatting window 410 and the input window 420.

The chatting window 410 includes a message 411 received from the reception terminal device 200 and a message 412 transmitted by the transmission terminal device 100. The received message 411 and the transmitted message 412 are messages that are encrypted and decrypted by the processor 140. The received message 411 and the transmitted message 412 may include the key index. Here, the processor 140 may determine the reception terminal device 200 to which the message is to be transmitted using the key index included in the received message 411 and the transmitted message 412.

When there are a plurality of chatting windows, the respective chatting windows 410 may have different key indexes and encryption keys. Meanwhile, in a case in which the chatting window 410 is a group chatting window 410 in which a plurality of other parties of chatting participate, the plurality of other parties of chatting may have the same key index and encryption key.

The message input window 420 displays a message that the user is inputting. The message displayed on the message input window 420 is a message that may not be encrypted and decrypted.

Figure 5:
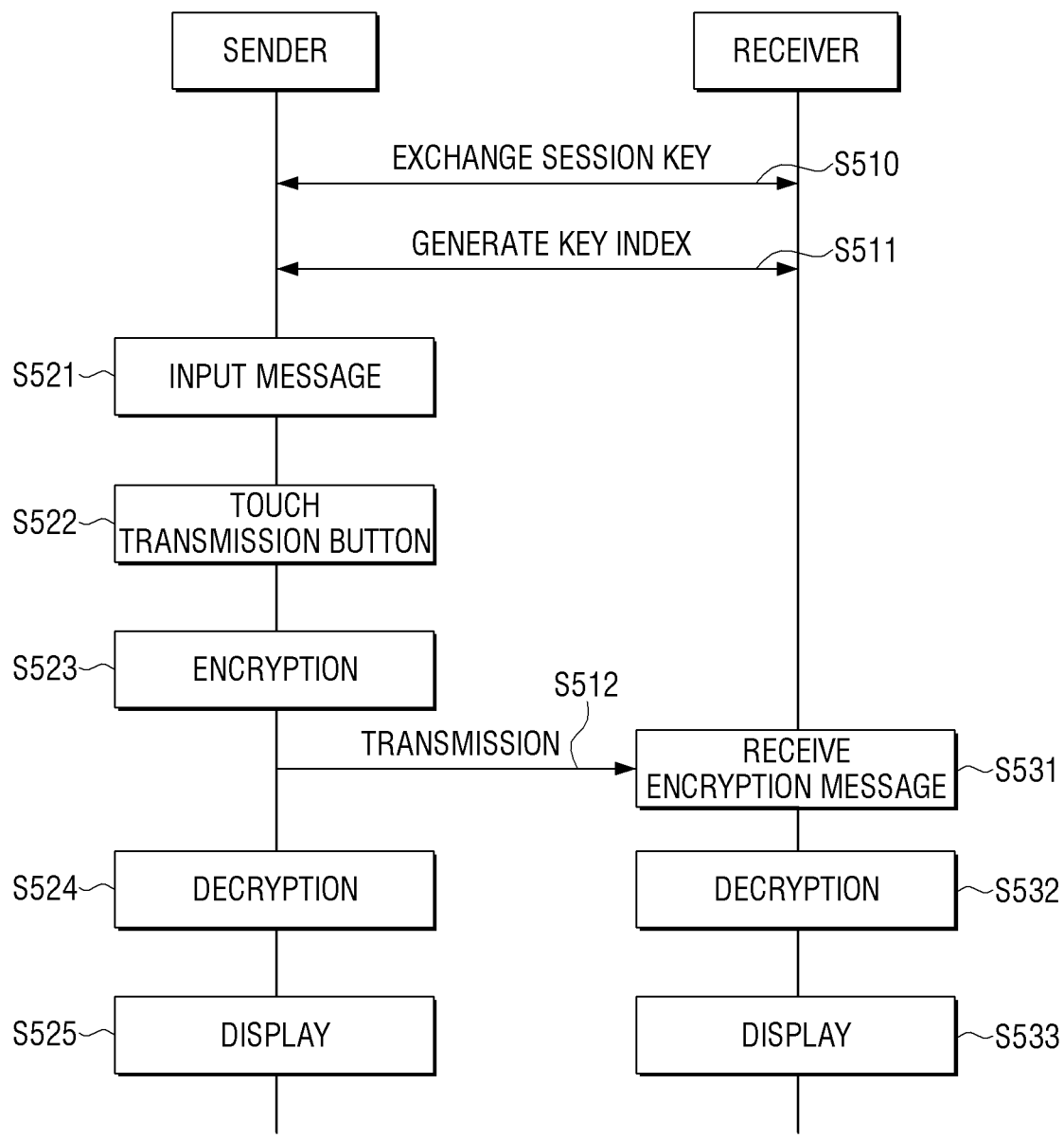
FIG. 5 is a flowchart illustrating a process of transmitting a message in a message transmission and reception system according to an exemplary embodiment.

FIG. 5 is a flowchart illustrating a process of transmitting a message in a message transmission and reception system according to an exemplary embodiment.

In a case in which the transmission terminal device 100 and the reception terminal device 200 first start chatting, both of the terminals may exchange the session key by using a Diffie-Hellman key exchange protocol (operation S501).

In a case in which the sharing of the session key is completed, the transmission terminal device 100 and the reception terminal device 200 each generate the key index. In this case, the key index may be generated by using the cryptographic hash function. If the message is input to the message input window 420 of the transmission terminal device 100 (operation S521) and a transmission button is input (operation S522), the processor 140 may encrypt the message input through the input 110 by using the encryption key. In this case, the processor 140 may add the key index to a header of the encrypted message.

The processor 140 may decrypt the encrypted message by using the encryption key (operation S524) and control the display 130 to display the decrypted message on the chatting window 410 (operation S525).

Meanwhile, if the processor 140 encrypts the message input through the input 110 by using the encryption key (operation S523), the processor 140 may control the communicator 120 to transmit the encrypted message to the reception terminal device 200 through the external server 300 (operation S512).

Meanwhile, the reception terminal device 200 receives the encrypted message (operation S531). In this case, the processor of the reception terminal device 200 may determine an encryption key used for decryption from the key index of the received message.

The processor of the reception terminal device 200 may decrypt the encrypted message by using the encryption key (operation S532), and control the display 130 to display the message on the chatting window (operation S533).

Figure 6:
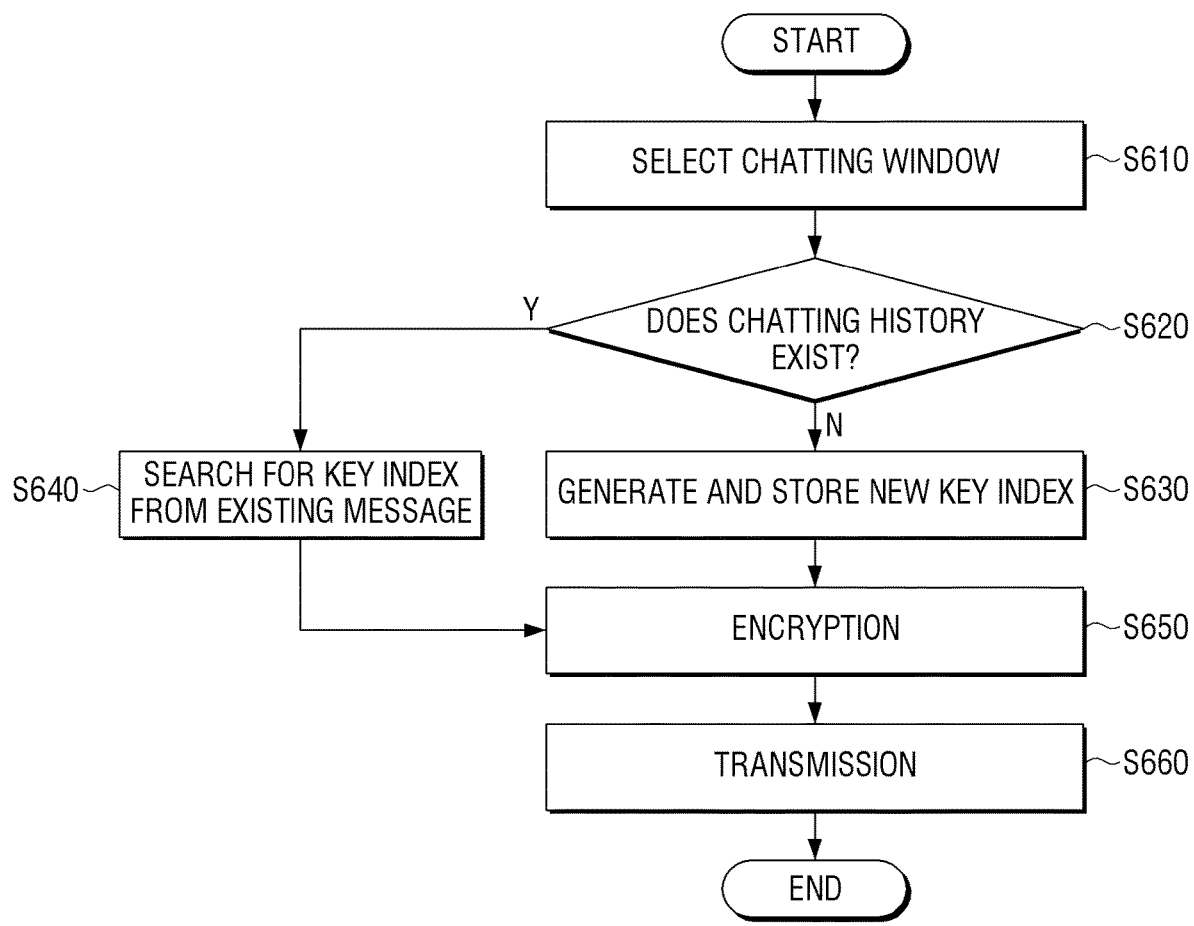
FIG. 6 is a flowchart illustrating an encryption process according to an exemplary embodiment.

FIG. 6 is a flowchart illustrating an encryption process according to an exemplary embodiment. Referring to FIG. 6, a sender selects the chatting window 410 with a receiver to chat in the chatting application of the terminal device 100 (operation S610).

The processor 140 determines whether or not a chatting history exists in the chatting window selected by the user (operation S620). If a previous chatting history does not exist in the chatting window (No in operation S620), the processor 140 exchanges the session key with the reception terminal device 200 and generates the key index and the encryption key from the session key. The generated key index and encryption key may be stored in the memory 150.

If the chatting history exists (Yes in operation S630), the processor 140 searches for the key index included in the header of the previous message existing in the chatting window (operation S640). That is, if the chatting with the reception terminal device 200 in which a previous chatting record exists is performed, each of the transmission terminal device 100 and the reception terminal device 200 performs the encryption and the decryption by using the stored index key and encryption key.

The processor 140 encrypts the message by using the key index and the encryption key (operation S650). In this case, the processor 140 may encrypt the message in a stream cipher scheme by using the encryption key. As another example, the processor 140 may encrypt the message by using a block cipher scheme.

Further, the processor 140 may add the key index to the header of the message encrypted by the stream cipher scheme.

The processor 140 controls the communicator 120 to transmit the message to the reception terminal device 200 through the external server 300 (operation S660).

Figure 7:
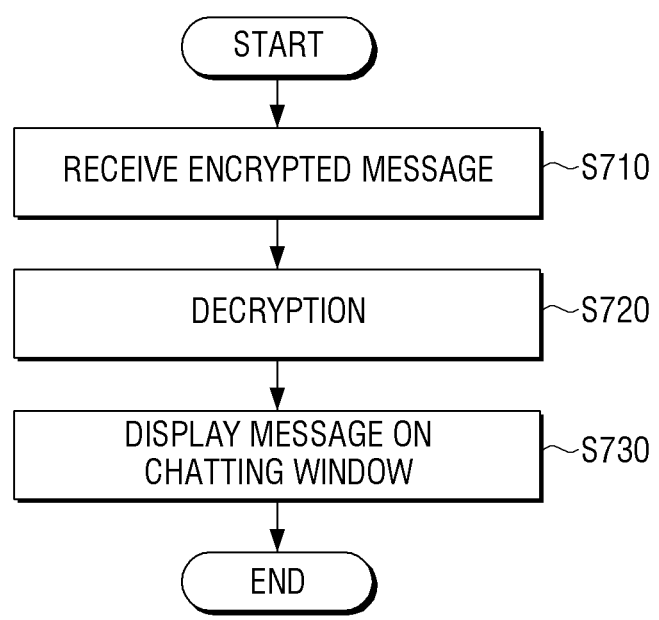
FIG. 7 is a flowchart illustrating a decrypting process according to an exemplary embodiment.

FIG. 7 is a flowchart illustrating a decoding process according to an exemplary embodiment.

Referring to FIG. 7, the processor of the reception terminal device 200 receives the encrypted message through the external server 300 (operation S710).

If the chatting history does not exist, that is, the message received by the reception terminal device 200 is a message that is received for a first time from the transmission terminal device 100, the reception terminal device 200 may exchange the session key with the transmission terminal device 100. After the exchange of the session key, the reception terminal device 200 may generate and store the key index and the encryption key.

If the chatting history exists, the processor of the reception terminal device 200 receiving the encrypted message may search for the encryption key corresponding to the key index included in the header of the received message.

The processor may decrypt the encrypted message by using the encryption key corresponding to the key index (operation S720). In this case, the processor may perform the decryption in the same scheme as the scheme in which the processor 140 of the transmission terminal device 100 performs the encryption.

The processor 140 transmits the decrypted message to the display 130 (operation S730), and the transmission and reception of the message end.

Figure 8:
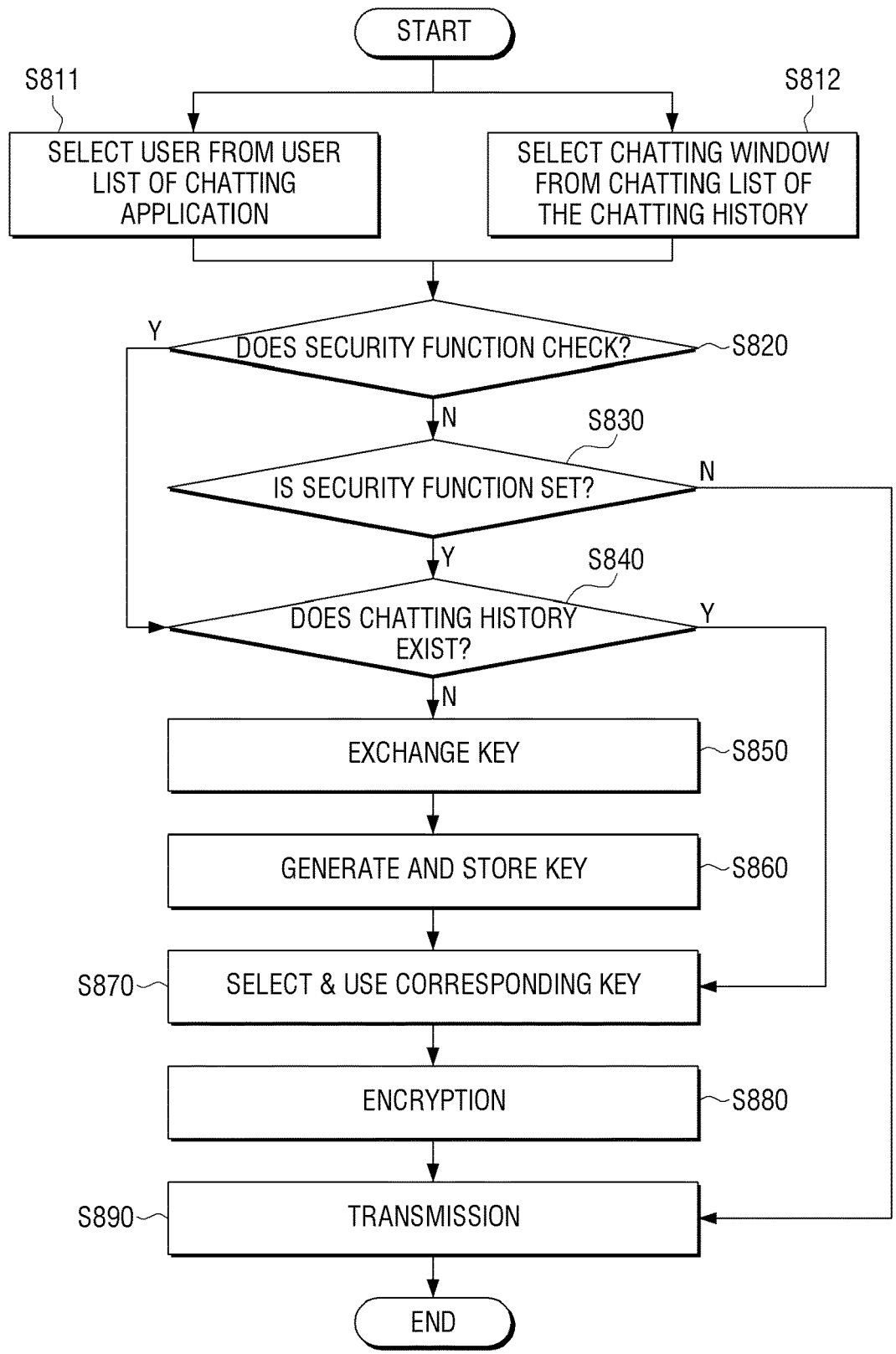
FIG. 8 is a flowchart illustrating a process of encrypting a message of a transmission terminal device according to an exemplary embodiment.

FIG. 8 is a flowchart illustrating a process of encrypting a message of a transmission terminal device according to an exemplary embodiment.

FIG. 8 illustrates an exemplary embodiment in which the user selects the above-mentioned encryption function to increase a convenience of use.

Specifically, if the transmission terminal device 100 according to an exemplary embodiment executes the chatting application, the transmission terminal device 100 may be configured to select whether to set an encryption security function. Further, the transmission terminal device 100 may also be configured to select a chatting window from a chatting list of a chatting history (operation S812) as well as to select a user from a user list of the chatting application (operation S811).

The processor 140 checks whether the security function is operated or selected (operation S820). Here, if the security function is activated (Yes in operation S820), the processor 140 checks whether or not the chatting history exists and begins to encrypt the message. If the security function is non-activated (No in operation S820), the processor 140 may request or inquire from the user as to whether to set the security function (operation S830). If the user does not want to set the security function (No in operation S830), the processor 140 may transmit the message to the reception terminal device 200 without performing the encryption.

If the user sets the security function (Yes in operation S830) and the chatting history exists (Yes in operation S840), the processor 140 selects the encryption key corresponding to the key index (operation S870) and encrypts the message (operation S880). The processor 140 may transmit the encrypted message to the reception terminal device (operation S890).

If the chatting history does not exist (No in operation S840), the processor 140 controls the memory 150 to exchange the session key with the reception terminal device 200, generate the key index and the encryption key, and store the generated key index and encryption key (operation S860). Next, the processor 140 selects the encryption key (operation S870) and encrypts the message (operation S880). Here, the key index may be added to the header of the encrypted message. The processor 140 may transmit the encrypted message to the reception terminal device (operation S890).

Hereinabove, although one or more exemplary embodiments have been described with reference to the drawings, those skilled in the art will appreciate that various modifications, additions and substitutions are possible, without departing from the scope and spirit of the inventive concept(s) as set forth in the accompanying claims.

What is claimed is:

1. A method for encrypting a message of a user terminal device, the method comprising:
    receiving a first message via a displayed message input window;
    displaying the received first message on a chatting window;
    encrypting, based on an instruction for transmitting the first message to an external device of another user in the chatting window being received, the first message using a key index and an encryption key corresponding to the chatting window; and
    transmitting the encrypted first message to the external device of the another user,
    wherein the encrypting comprises:
        determining whether a history for the chatting window exists; and
        based on determining that the history exists, adding the key index included in at least one previous message of the history to the first message, and encrypting the first message using an encryption key corresponding to the key index included in the at least one previous message.

2. The method as claimed in claim 1, further comprising:
    receiving a second message encrypted using the key index and the encryption key, from the external device of the another user;
    decrypting the encrypted second message by using the key index and the encryption key based on the encrypted second message being received from the external device of the another user; and
    displaying the decrypted second message on the chatting window.

3. The method as claimed in claim 1, wherein the encrypting further comprises:
    based on determining that the history does not exist, generating the key index and the encryption key corresponding to the chatting window; and
    adding the generated key index to the first message and encrypting the first message using the generated encryption key.

4. The method as claimed in claim 3, wherein the encrypting further comprises:
    based on determining that the history does not exist, exchanging a session key between the user terminal device and the external device of the another user in the chatting window; and
    generating the key index corresponding to the session key.

5. The method as claimed in claim 4, wherein the session key is generated by a Diffie-Hellman key agreement protocol.

6. The method as claimed in claim 1, wherein the encrypted first message is a result of stream cipher encryption.

7. A user terminal device encrypting and decrypting a message, the user terminal device comprising:
    an input interface configured to receive an input of a first message;
    a communicator configured to perform communication with an external terminal;
    a display configured to display the input first message on a chatting window; and
    a processor configured to:
        based on an instruction for transmitting the first message to an external device of another user in the chatting window being received, encrypt the first message using a key index and an encryption key corresponding to the chatting window, and
        control the communicator to transmit the encrypted first message to the external device of the another user,
    wherein the processor is configured to:
        determine whether a history for the chatting window exists, and
        based on determining that the history exists, add the key index included in at least one previous message of the history to the first message, and encrypt the first message using an encryption key corresponding to the key index included in the at least one previous message.

8. The user terminal device as claimed in claim 7, wherein:
    the communicator is configured to receive an encrypted second message from the external device of the another user and to provide the encrypted second message to the processor, and
    the processor is configured to decrypt the encrypted second message by using the key index and the encryption key based on the encrypted second message being received from the communicator.

9. The user terminal device as claimed in claim 7, wherein the processor is configured to:
    based on determining that the history does not exist, generate the key index and the encryption key corresponding to the chatting window, and
    add the generated key index to the first message and encrypt the first message using the generated encryption key.

10. The user terminal device as claimed in claim 9, wherein the processor is configured to:
    based on determining that the history does not exist, exchange a session key between the user terminal device and the external device of the another user in the chatting window, and
    generate the key index corresponding to the session key.

11. The user terminal device as claimed in claim 10, wherein the session key is generated by a Diffie-Hellman key agreement protocol.

12. The user terminal device as claimed in claim 7, wherein the encrypted first message is a result of stream cipher encryption.

13. A non-transitory computer readable recording medium including a program executing a method for encrypting and decrypting a message of a user terminal device, wherein the method includes:
    receiving a first message via a displayed message input window;
    displaying the received first message on a chatting window;

encrypting, based on an instruction for transmitting the first message to an external device of another user in the chatting window being received, the first message using a key index and an encryption key corresponding to the chatting window; and transmitting the encrypted first message to the external device of the another user, wherein the encrypting comprises:

determining whether a history for the chatting window exists; and based on determining that the history exists, adding the key index included in at least one previous message of the history to the first message, and encrypting the first message using an encryption key corresponding to the key index included in the at least one previous message.

14. The non-transitory computer readable recording medium as claimed in claim 13, wherein the method further comprises:

receiving a second message encrypted using the key index and the encryption key from the external device of the another user;

decrypting the encrypted second message by using the key index and the encryption key based on the encrypted second message being received from the external device of the another user; and displaying the decrypted second message on the chatting window.

15. The non-transitory computer readable recording medium as claimed in claim 13, wherein the encrypting further comprises:

based on determining that the history does not exist, generating the key index and the encryption key corresponding to the chatting window; and adding the generated key index to the first message and encrypting the first message using the generated encryption key.

16. The non-transitory computer readable recording medium as claimed in claim 15, wherein the encrypting further comprises:

based on determining that the history does not exist, exchanging a session key between the user terminal device and the external device of the another user in the chatting window; and generating the key index corresponding to the session key.

17. The non-transitory computer readable recording medium as claimed in claim 16, wherein the session key is generated by a Diffie-Hellman key agreement protocol.

* * * * *